United States Patent [19]

Clary et al.

[11] Patent Number: 5,380,189
[45] Date of Patent: Jan. 10, 1995

[54] METHOD FOR DEYDRATING VEGETIVE MATTER

[75] Inventors: Carter D. Clary, Clovis; Vincent E. Petrucci, Fresno, both of Calif.

[73] Assignee: California State University, Fresno Foundation, Fresno, Calif.

[21] Appl. No.: 100,388

[22] Filed: Aug. 2, 1993

Related U.S. Application Data

[63] Continuation of Ser. No. 793,471, Nov. 18, 1991, abandoned.

[51] Int. Cl.⁶ .............................................. A23L 1/212
[52] U.S. Cl. ................................... 426/438; 426/456; 426/640
[58] Field of Search ....................... 426/438, 456, 640

[56] References Cited

U.S. PATENT DOCUMENTS 3,261,694  7/1966  Forkner .
3,335,015  8/1967  Forkner .
3,718,485  2/1973  Lankford .
3,882,253  5/1975  Schafer et al. .
4,006,260  2/1977  Webb et al. .
4,242,365  12/1980 Numata et al. .
4,713,252  12/1987 Ismail .
4,732,081  3/1988  Sakuma .......................... 426/438 X
4,769,249  9/1988  Webb .
4,814,190  3/1989  Ismail .
4,857,347  8/1989  Webb ................................. 426/438

Primary Examiner—Arthur L. Corbin
Attorney, Agent, or Firm—Worrel & Worrel

[57] ABSTRACT

A method for dehydrating vegetive matter including the steps of heating a liquid medium to a predetermined temperature; applying negative pressure to the liquid medium; and placing the matter to be dehydrated in the liquid medium to cause dehydration thereof. An apparatus for dehydrating matter having a vessel having an internal vacuum chamber adapted to receive a liquid medium; a system for applying a negative pressure to said liquid medium; a system for heating the liquid medium; and an assembly for placing matter to be dehydrated in the liquid medium to cause dehydration thereof.

7 Claims, 2 Drawing Sheets

METHOD FOR DEYDRATING VEGETIVE MATTER

This is a continuation of copending application Ser. No. 07/793,471 filed on Nov. 18, 1991, now abandoned.

BACKGROUND OF THE INVENTION

1. Field of the Invention

The present invention relates to a method and apparatus for dehydrating matter and, more particularly, to such a method and apparatus which are particularly well suited to the preservation of vegetive matter, such as fruit, in a dehydrated form which is of superior commercial quality and without the use of hazardous substances heretofore required by the prior art.

2. Description of the Prior Art

Preservation of food stuffs is one of the earliest technologic; developed by the human race. Without the capability of preserving perishable commodities in some form, human life cannot be sustained. As a consequence, the technologies developed through the centuries directed to this purpose are highly developed and diverse.

Nonetheless, since the products resulting from the practice of these technologies are ingested, sensitivity to potentially toxic substances borne by such food products is of continual concern. While experience through the ages has developed well entrenched principals as to which technologies may not be tolerated, a more recent public sensitivity to long range potential residual injury has indicated that some traditional technologies may nonetheless be objectionable.

For example, various processes have been developed for preserving vegetive matter and particularly fruit by dehydration producing such dried fruits as peaches, apricots, and grapes thereby forming raisins. More specifically, for example, apricots and golden seedless raisins are produced by pretreatment of the fresh fruit by dipping in a solution of water and sodium hydroxide heated to a temperature of 180° Fahrenheit for 5 to 10 seconds. The fruit is subsequently exposed to a high concentration of sulfur dioxide applied in a gaseous form or, more traditionally, as a product of the combustion of elemental sulfur for this purpose. In the case of golden seedless raisins, the exposure of the fruit to sulfur dioxide bleaches the fruit to a bright yellow and commercially acceptable color thereby reversing the discoloration of the fruit which results from the heat of the pretreatment and dehydration. Residual sulfur dioxide adheres to the fruit tissue inhibiting discoloration due to oxidation and preserving the golden color of the fruit for as long as one year.

While the beneficial effects of the residual sulfur dioxide in inhibiting discoloration and preserving of the fruit for a lengthy period of time has long been recognized, more recently the potentially detrimental effects of its presence have been identified. The presence of sulfur on the fruit tissue in any of its several forms, has been identified by certain scientific authorities as harmful, or potentially harmful, when ingested.

A secondary consequence of such identification is the fact that governmental organizations, particularly in Europe, have banned the import of food stuffs retaining any residual sulfur. Since the state of technology in the production of commercially acceptable golden seedless raisins, for example, is solely dependent upon the use of sulfur in any of its various forms, these governmental bans have indirectly eliminated the market for such products in these countries.

The foregoing example is representative of a number of technologies directed to the preservation of food stuffs which have become inadequate due to the sensitivity of scientific and governmental authorities to the presence of residual substances adhering to the food stuffs as a result of the technology employed in its preservation. The attendant closing of these markets domestically and in foreign countries has in many instances dealt crippling blows to the agricultural industries devoted thereto.

Therefore, it has long been known that it would be desirable to have a method and apparatus for dehydrating matter having application to a wide variety of types of food stuffs which operate rapidly and dependably to preserve the matter in a state which is of superior commercial value while operating only with the use of benign substances and techniques which leave substantially no residual harmful substances on the food stuffs, but which in all other respects produce an entirely commercially successful product.

SUMMARY OF THE INVENTION

Therefore, it is an object of the present invention to provide an improved method and apparatus for dehydrating matter.

Another object is to provide such a method and apparatus which cooperate to achieve the production of a superior commercially acceptable product when applied to a wide variety of types of matter to be preserved and are particularly well suited to the preservation of vegetative matter.

Another object is to provide such a method and apparatus which are particularly well suited to the preservation of fresh fruit, such as apricots and grapes, by a process of dehydration which dehydrates the fruit to an optimum extent more rapidly than has heretofore been possible.

Another object is to provide such a method and apparatus which produce an entirely commercially successful food product without the residual presence of any harmful, or potentially harmful, substances thereon.

Another object is to provide such a method and apparatus which, when applied in the preservation of grapes to form golden seedless raisins, produce the golden seedless raisins with a clear golden color characteristic of the conventionally produced golden seedless raisins having strong commercial appeal in a host of countries of the world, but without the presence of residual sulfur or any other substance of harmful, or potentially harmful, character.

Another object is to provide such a method and apparatus which produce a dehydrated edible food product possessing only trace amounts of vegetable oil other than the natural composition of the food product itself.

Another object is to provide such a method and apparatus which can be employed on a commercial scale to produce food products entirely acceptable to scientific and governmental organizations which have heretofore objected to or barred the importation of such food products produced by conventional processes.

Another object is to provide such a method and apparatus which can be employed on a commercial scale at a commercially acceptable price and with a production capability fully compatible with conventional commercial methods and apparatuses and which possess the capability of more precisely controlling the character and appearance of the food product than has heretofore been possible.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the method and apparatus of the present invention, by heating a liquid medium to a predetermined temperature; applying negative pressure to the liquid medium; and placing matter to be dehydrated in the liquid medium to cause dehydration thereof.

DESCRIPTION OF THE PREFERRED EMBODIMENT

Figure 1:
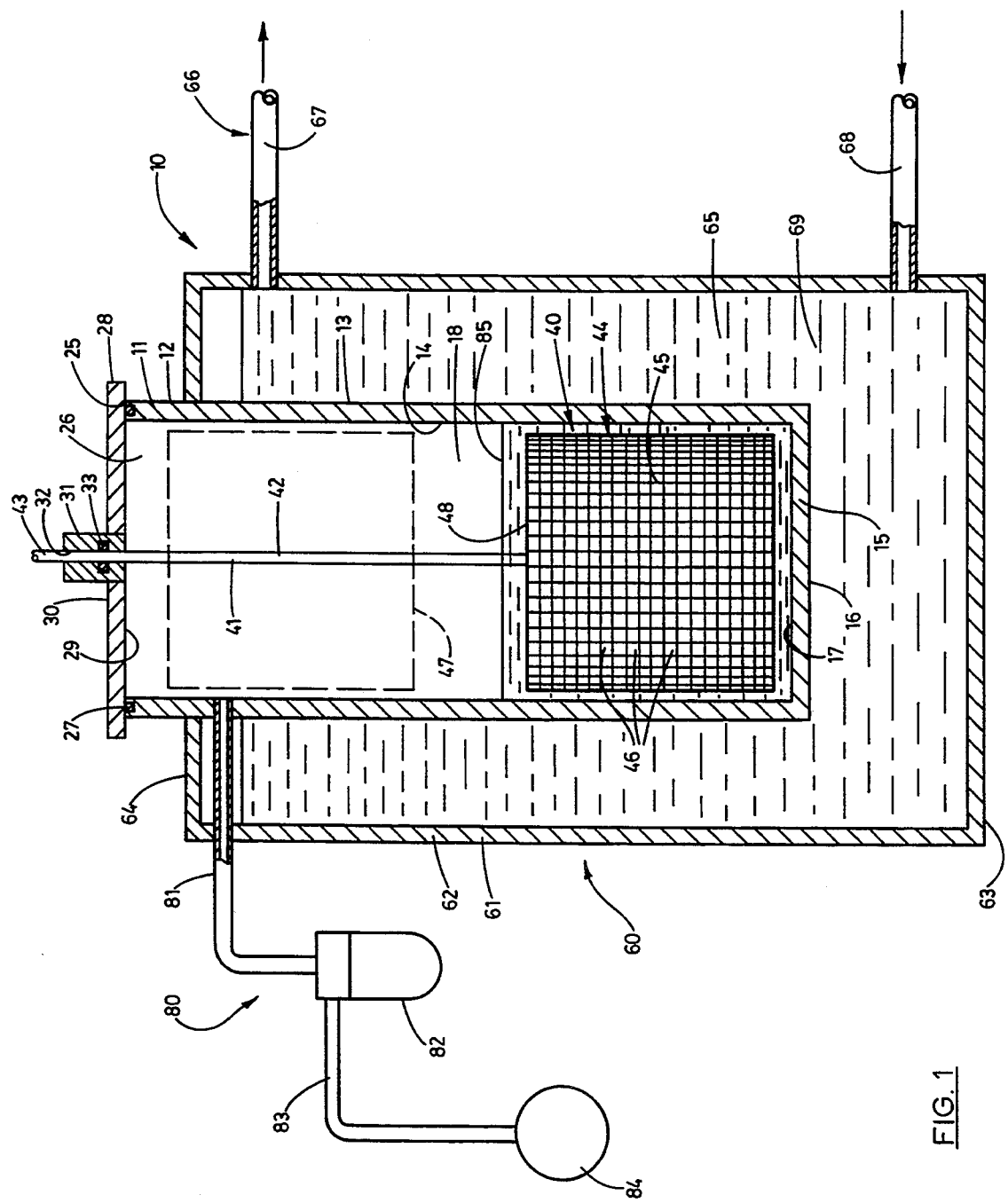
FIG. 1 is a fragmentary, vertical section of the apparatus dehydrating matter of the present invention.

Referring more particularly to the drawings, the apparatus operable in the practice of the method of the present invention is generally indicated by the numeral 10 in FIG. 1. It will be understood that the apparatus shown in FIG. 1 is simply a representative embodiment of a wide variety of embodiments of the apparatus operable for use in the practice of the method of the present invention. As such, it is indicative of the structure and operation required in the preferred embodiments of the apparatus, but not necessarily representative of the most efficient commercial version thereof. Commercial versions of the apparatus of the present invention take a wide variety of specific forms dependent largely upon the type of matter to be dehydrated therewithin, the volume of matter which can efficiently and effectively be dehydrated in a given batch and a wide variety of other considerations which control its preferred operative form. Nonetheless, the apparatus 10 shown in FIG. 1 has been found entirely effective and efficient in the practice of the method of the present invention.

The apparatus 10 has a vacuum vessel 11 including a cylindrical side wall 12 of sufficient thickness to withstand the application of atmospheric pressure thereagainst upon the subjection of the interior thereof to the desired negative pressure. The cylindrical sidewall has a cylindrical external surface 13 and an opposite cylindrical internal surface 14.

The vacuum vessel 11 has an end wall 15 mounted in sealing relation on the cylindrical sidewall 12 and having an external surface 16 and an opposite internal surface 17. As with the cylindrical sidewall 12, the end wall is of sufficient thickness to withstand the application of atmospheric pressure thereagainst. The cylindrical sidewall and end wall define a vacuum chamber 18 therewithin.

The cylindrical sidewall 12 of the vacuum vessel 11 has an annular surface 25 defining a plane substantially normal to the cylindrical sidewall and bounding an annular opening 26 leading into the vacuum chamber 18. A suitable seal 27 is mounted in and extends about the annular surface. A disc like lid or closure 28, having a substantially flat lower surface 29 and an upper surface 30, is positionable in sealing engagement with the seal 27 of the annular surface 25 of the cylindrical sidewall 12, as shown in FIG. 1. The closure 28 has a central shaft housing 31 having a cylindrical passage 32 extending therethrough substantially axially related to the closure. An annular seal 33 is mounted in the shaft housing communicating with the passage 32 thereof. The closure can releasibly be secured in sealing relation on the annular surface 25 and seal 27 of the vacuum vessel by any suitable means, not shown.

The apparatus 10 has a holding assembly 40 including an elongated shaft 41 which extends through the cylindrical passage 32 of the shaft housing 31 and is engaged by the annular seal 33 to form an airtight seal therewith. The shaft may be viewed as having an interior portion 42 within the vacuum chamber 18 and an exterior portion 43 externally of the vacuum chamber and shaft housing. A permeable container, basket, or cage 44 is mounted on the interior portion 42 of the shaft 41. The cage is preferably constructed of a closed wire grid 45 defining a multiplicity of openings 46 to permit the substantially free movement of liquid to and from the interior of the cage. Using the shaft 41, the cage can be moved between a first position 47 in the upper portion of the vacuum chamber, as viewed in FIG. 1, and a second position 48 in the lower portion of the vacuum chamber.

The apparatus 10 has a heat exchanger 60 mounted on and encapsulating a substantial portion of the vacuum vessel 11, as shown in FIG. 1. The heat exchanger includes a tank 61 having a cylindrical sidewall 62 and a bottom wall 63. The tank has a top wall 64 which extends substantially concentrically about the vacuum vessel as does the cylindrical sidewall. The tank thus forms a fluid tight chamber about a substantial portion of the vacuum vessel and encloses that portion of the vacuum vessel in an internal chamber 65 thereof.

The heat exchanger includes a recirculation system 66 fragmentarily shown in FIG. 1 having an upper conduit 67 extending through the cylindrical sidewall 62 of the tank 61 and a lower conduit 68 also extending through the cylindrical sidewall of the tank. It will be understood that the recirculation system of the heat exchanger 60 can be of any suitable type operable to pump a heating fluid 69, preferably heated water or steam, to and from the internal chamber 65 of the tank about the vacuum vessel to maintain the heating fluid 69 at the desired temperature consistent with the practice of the method of the present invention hereinafter to be described.

The apparatus 10 has a vacuum system 80 including a first vacuum conduit 81 extending in sealing relation through the cylindrical sidewall 62 of the tank 61 and through the cylindrical sidewall 12 of the vacuum vessel 11 into communication with the vacuum chamber 18 of the vacuum vessel. The first vacuum conduit is connected to a oil trap 82 which, in turn, is connected through a second vacuum conduit 83 with a vacuum pump 84. It will be understood that the vacuum pump can be of any suitable type operable, upon demand, to extract the atmospheric air and water vapor from within the vacuum chamber 18 of the vacuum vessel 11 to reduce the pressure therewithin to the desired level consistent with the practice of the method of the present invention. The vacuum pump is also selectively operable to restore atmospheric pressure within the vacuum chamber.

In accordance with the practice of the method of the present invention, a liquid medium 85 is deposited in the lower portion of the vacuum chamber 18 covering the area defined by the second position 48 of the cage 44 previously identified. The liquid medium can be of any suitable type, but it has been found that a vegetable oil and, in particular, a vegetable oil sold under the trademark "DURKEX 500" manufactured by Van Den Bergh Foods Company of Cleveland, Ohio, is best suited to the purpose because of its stability and resistance to oxidation. Other liquid mediums which have produced promising results are paraffine and other substances.

Figure 2:
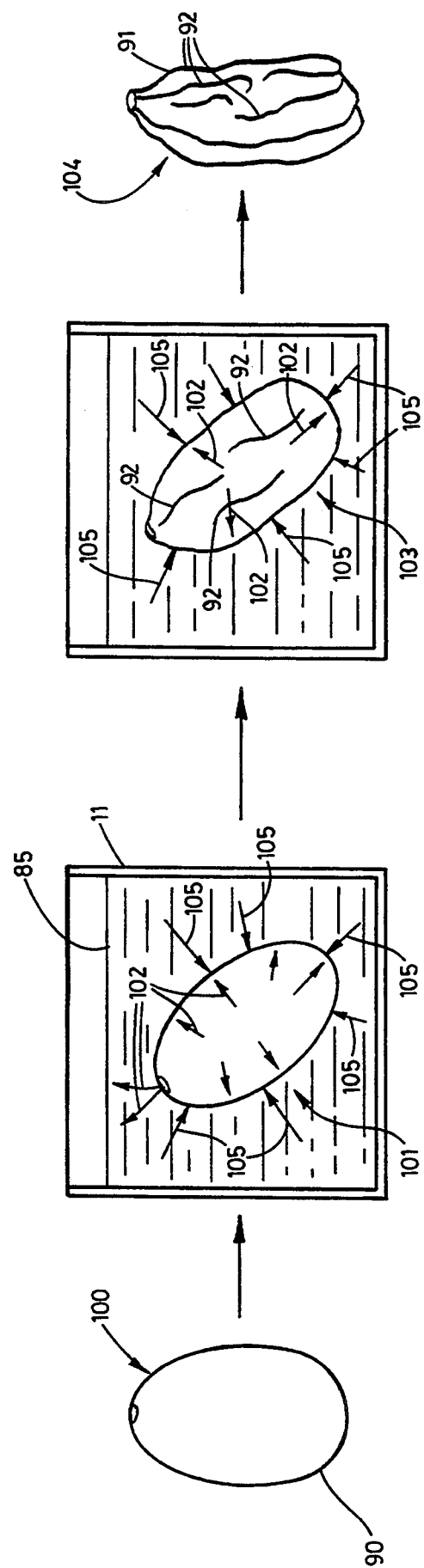
FIG. 2 is a diagrammatic view representing the practice of the method of the present invention in the dehydration of a representative fresh ripe grape to form a golden seedless raisin and diagrammatically showing the stages in the dehydration of the grape to form the raisin.

Referring more particularly to FIG. 2, a diagrammatic representation of the method of the present invention is illustrated therein as applied in the dehydration of a representative edible product, in this case, a fresh ripe grape dehydrated to form a golden seedless raisin. As shown therein, a fresh ripe grape is generally indicated at 90 and the resultant raisin at 91. In order to produce a commercially successful product, the appearance of the product must be such as to be entirely consistent with conventionally produced food products while avoiding the detrimental side effects heretofore associated with such products. Accordingly, as can be seen in the case of the raisin 91, the raisin is so dehydrated as to form wrinkles 92 entirely consistent and indistinguishable from raisins produced by conventional methods.

Referring again to FIG. 2, a representative grape 90 is shown in a first stage 100 prior to processing; a second stage 101 in the liquid medium 85 during which the moisture within the raisin is driven off as indicated by the arrows 102; in a third stage 103 at which time it is still within the liquid medium, but ready to be removed therefrom; and a fourth stage 104 having achieved the desired appearance and configuration of a golden seedless raisin. In the second stage 101, and the third stage 103, as will hereinafter be explained in greater detail, the weight of the liquid medium 85 applies pressure, indicated by arrows 105, against the grape initiating the collapse of the grape as the moisture within the grape is driven off as indicated by arrows 102.

OPERATION

The operation of the apparatus of the described embodiment of the present invention is believed to be readily apparent and is briefly summarized at this point.

The practice of the method of the present invention, in the first steps thereof, can perhaps best be visualized upon reference to FIG. 1. The closure 28 is removed from the sealed position shown in FIG. 1 to gain access to the cage 44 which is removed from the vacuum vessel and filled with the desired quantity of matter to be dehydrated. In the embodiment herein described, the cage is filled with grapes of a variety suitable for the production of golden seedless raisins in the practice of the method of the present invention. The fruit is prepared by removing the berries of the grapes from the clusters, washing the grapes and weighing them. Preferably prior to placing the grapes in the cage and the cage within the vacuum vessel 18, the heat exchanger 60 is operated to heat the liquid medium 85 within the vacuum vessel to a heat of substantially not greater than 165° Fahrenheit. This is achieved over time by circulating the heating fluid 69 through the recirculation system 66 to and from the internal chamber 65 of the tank 61 until the temperature of the liquid medium 85 within the vacuum vessel has reached the desired temperature. The optimum temperature for the liquid medium varies depending upon the particular matter to be dehydrated and the specific result desired to be achieved. The temperature for the liquid medium of substantially not greater than 165° Fahrenheit has been found optimum for producing golden seedless raisins having the appearance of conventionally produced golden seedless raisins, but without the residual presence of sulfur. Other matter may require other temperatures to be maintained. However, all such temperatures are lower than has heretofore been the case, as will subsequently be explained in greater detail.

The closure 28 is then returned to the sealing position with the cage within the vacuum chamber 18 and the closure secured, by any suitable means, not shown, in sealing engagement with the seal 27 to form an air tight seal. During this process, the cage is retained in the first position 47 so that the cage, and thereby the grapes 90 therewithin, are not submersed in the heated liquid medium 85.

Thereafter, the vacuum system 80 is operated to withdraw air from within the vacuum chamber 18 to produce a predetermined negative pressure therewithin. In the preferred embodiment, the negative pressure within the vacuum chamber is reduced to about 90 Torr (mm Hg). Upon achieving the desired negative pressure, the cage is lowered into the liquid medium using the shaft 41 until the cage and its contents are completely submersed in the heated liquid medium in the second position 48. It is at this point that dehydration of the grapes begins. This period of time required for such dehydration varies depending upon the type of matter being dehydrated and the results desired to be achieved therein. In the case of the production of golden seedless raisins from the grapes 90, the grapes are left in the liquid medium from substantially about one (1) hour to substantially about three (3) hours. During such dehydration, the moisture content of the grapes is reduced to about eight percent (8%) to ten percent (10%) of normal resulting from moisture being driven from the grapes as illustrated by the arrows 102.

The foregoing step as described causes evolution of the moisture from the grapes at a rate which not only reduces the moisture content to the percentage indicated, but also counter balances the pressure, or weight, of the liquid medium 85 so as to prevent infusion of the liquid medium to the grapes replacing the moisture removed therefrom. Thus, when the method is performed within the above-specified parameters, a balance is achieved between the rate of evolution of the moisture from the grapes and the pressure applied by the liquid medium against the outer surface of the grape.

When the above-identified period has elapsed for leaving the grapes 90 in the liquid medium, the cage is lifted, using the shaft 41, to raise the cage and its contents to the first position 47 so that the grapes 90 are completely removed from the liquid medium 85. The liquid medium, of course, drains by gravity from the grapes within the cage. The grapes are removed from the liquid medium at the prescribed time to prevent further dehydration of the grapes as well as to prevent the infusion of the liquid medium to the grapes previously described. At this point, the rate of evolution of moisture from the grapes has slowed to the point that such infusion would begin to become possible unless the grapes were so removed from the liquid medium.

The next step in the practice of the method of the present invention is to rotate the shaft 41, using a drill motor or the like not shown. The cage 44 and the grapes 90 therewithin are thereby rotated to apply centrifugal force thereto at a high rate of speed driving off substantially all of the liquid medium from the grapes within the cage other than very small surface amounts. This result can also be achieved later in the method by mechanical agitation, after removal of the grapes from the vessel 11, by shaking the grapes while they are resting on a screen such as that of a shaking table known in the industry.

Upon completion of the foregoing step, the configuration of the grapes so treated is substantially as shown at 103. The grapes have had their moisture content reduced to about eight percent (8%) to ten percent (10%) of their natural moisture content, but in the negative pressure of the vacuum chamber they are only partially collapsed, as shown at stage 103.

The next step in the method calls for the vacuum system 80 again to be operated to return the vacuum chamber 18 to normal atmospheric pressure. The application of normal atmospheric pressure to the grapes causes them further to collapse upon themselves as accommodated by the moisture removed therefrom. Such collapsing of the grapes under the impetus of normal atmospheric pressure causes the grapes to assume the configuration of, and therefore become, golden seedless raisins having wrinkles 92 and otherwise possessing an appearance identical to that of golden seedless raisins produced by conventional methods, but without the presence of any sulfur whatsoever.

Once atmospheric pressure has been restored to the vacuum chamber 18, the closure 28 is again released from the annular surface 25 of the cylindrical sidewall 12 of the vacuum vessel 11 to permit removal of the grapes 90, now raisins 91, from the cage. As noted, the raisins are at this point golden seedless raisins substantially identical to conventional golden seedless raisins, except that there is no presence of sulfur thereon and only trace amounts of the liquid medium; that is, in the preferred embodiment, vegetable oil.

In the preferred embodiment, the raisins so formed have only trace amounts of vegetable oil thereon which is entirely edible and harmless and does not detract from the flavor of the raisins in that it is present in such small quantities and in that, in any event, it has a neutral flavor. However, an additional step can, if desired, be employed in the practice of the method. This additional step involves washing the resulting raisins in a solution of a recoverable solvent, or emulsifier to remove the vegetable oil therefrom. The solvent or emulsifier is then itself rinsed from the raisins using a fresh water solution containing less than one percent (1%) citric acid or other acceptable antioxidant. The resulting raisins are thus rendered substantially free of the vegetable oil or any other substance. As previously set forth, the resulting golden seedless raisins have no sulfur compounds of any type or of any quantity thereon.

The foregoing description constitutes all of the steps involved in the practice of the method of the present invention. However, it will be recognized that variations will be made therein and steps added thereto for the purpose of producing specific beneficial effects in the raisins or other matter so formed and as consistent with the packaging and shipment of the raisins in the commercial stream of commerce.

However, it will be seen that the practice of the method of the present invention achieves principally the duplication of commercial versions of golden seedless raisins in the preferred embodiment but without the use of any sulfur whatsoever thereby avoiding the presence of residual sulfur on the completed product. Other advantages achieved in the practice of the method of the invention include more precisely controlling the result achieved than is possible with conventional methods; producing more uniform results from raisin to raisin; being able to produce different results than with conventional methods as, for example, greater or lesser water content, coloration and the like and applicability of the method to dehydration of a wide variety of types of matter including other fresh fruit and vegetables, as well as other types of matter subject to dehydration.

Therefore, the method and apparatus for dehydrating matter of the present invention operates to achieve the production of a superior commercial product more rapidly and more dependably with the capability of more controlled variation in the results achieved all in a product which is not to any respect contaminated with residual substances of a harmful, or potentially harmful, nature such as residual sulfur.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A method for dehydrating vegetive matter to produce a resultant product having a pliable, collapsed, wrinkled appearance and a soft, chewy texture without the use of sulfur, the method comprising the steps of:
   submersing said vegetive matter, in a substantially fresh, natural form, in a liquid medium heated to a temperature of substantially not greater than one hundred and sixty-five degrees Fahrenheit (165° F.);
   applying a negative pressure to said liquid medium and the vegetive matter submersed therewithin; leaving said vegetive matter in said liquid medium under said negative,pressure in the range of from about one (1) hour to about three (3) hours until said vegetive matter has been dehydrated to about eight percent (8%) to ten percent (10%) of its ambient moisture content; and
   subsequently removing the vegetive matter from the liquid medium and then subjecting said vegetive matter to ambient atmospheric pressure to cause the vegetive matter to partially collapse to form said wrinkled appearance and soft, chewy texture.

2. The method of claim 1 wherein said removing and subjecting steps are performed after said vegetive matter has been dehydrated to about ten percent (10%) of its ambient moisture content.

3. The method of claim 1 wherein said negative pressure in said applying step is substantially about ninety (90) Torr (mm Hg).

4. A method for dehydrating grapes to produce raisins, without the use of sulfur, the method comprising the steps of:
   submersing said grapes in a vegetable oil heated to a temperature of substantially not greater than one hundred and sixty-five degrees Fahrenheit (165° F.);

applying a negative pressure to said vegetable oil and the grapes submersed therewithin;

leaving said grapes in the vegetable oil under said negative pressure for a period of time in the range of from about one (1) hour to about three (3) hours until said grapes have been dehydrated to about ten percent (10%) of their ambient moisture content;

removing said grapes from the vegetable oil and, while under said negative pressure, centrifugally removing residual vegetable oil therefrom; and then subjecting said grapes to ambient atmospheric pressure to cause said grapes to collapse to the extent of achieving a wrinkled external appearance thereby producing raisins from said grapes.

5. The method of claim 4 wherein said removing and subjecting steps are performed after said grapes have been dehydrated to about ten percent (10%) of their ambient moisture content.

6. A method for dehydrating apricots or peaches to produce a resultant product of intermediate moisture content exhibiting a collapsed, wrinkled appearance and a soft, chewy texture without the use of sulfur, the method comprising the steps of:

submersing said apricots or peaches in a vegetable oil heated to a temperature of substantially not greater than one hundred and sixty-five degrees Fahrenheit (165° F.);

applying a negative pressure for a period of time to said vegetable oil and the apricots or peaches submersed therewithin;

leaving said apricots or peaches in the vegetable oil under said negative pressure in the range of from about one (1) hour to about three (3) hours until said apricots or peaches have been dehydrated to about ten percent (10%) of their ambient moisture content;

removing said apricots or peaches from the vegetable oil and, while under said negative pressure, centrifugally removing residual vegetable oil therefrom; and then subjecting said apricots or peaches to ambient atmospheric pressure to cause said apricots or peaches to collapse to the extent of achieving a wrinkled external appearance and a soft, chewy texture.

7. The method of claim 6 wherein said removing and subjecting steps are performed after the apricots or peaches have been dehydrated to about ten percent (10%) of their ambient moisture content.

* * * * *

UNITED STATES PATENT AND TRADEMARK OFFICE
CERTIFICATE OF CORRECTION

PATENT NO. : 5,380,189
DATED : January 10, 1995
INVENTOR(S) : CARTER D. CLARY; VINCENT E. PETRUCCI It is certified that error appears in the above-identified patent and that said Letters Patent is hereby corrected as shown below:

Column 1, lines 18 & 19, delete "technologic;" and substitute ---technologies---.

Column 3, line 18, before "dehydrating matter" insert ---for---.

Column 4, line 20, delete "," after 41 and insert ---.---.

Column 8, line 45, between "negative" and "pressure" delete ---,---.

Signed and Sealed this

Fourteenth Day of March, 1995

Attest:

BRUCE LEHMAN

Attesting Officer

Commissioner of Patents and Trademarks